(12) United States Patent
Eck et al.

(10) Patent No.: US 11,618,956 B2
(45) Date of Patent: Apr. 4, 2023

(54) BIPOLAR PLATE FOR USE IN AN ELECTROCHEMICAL DEVICE

(71) Applicant: AIRBUS DEFENCE AND SPACE GMBH, Taufkirchen (DE)

(72) Inventors: Thomas Eck, Taufkirchen (DE);
Walter Jehle, Taufkirchen (DE);
Winfried Lohmiller, Taufkirchen (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 210 days.

(21) Appl. No.: 16/689,526

(22) Filed: Nov. 20, 2019

(65) Prior Publication Data

US 2020/0168920 A1 May 28, 2020

(30) Foreign Application Priority Data

Nov. 27, 2018 (DE) .......................... 102018129887.0

(51) Int. Cl.
| | |
|---|---|
| *H01M 8/0258* | (2016.01) |
| *C25B 9/75* | (2021.01) |
| *H01M 8/0267* | (2016.01) |
| *H01M 8/04029* | (2016.01) |
| *H01M 8/04007* | (2016.01) |
| *C25B 11/036* | (2021.01) |

(52) U.S. Cl.
CPC .............. *C25B 9/75* (2021.01); *C25B 11/036* (2021.01); *H01M 8/0258* (2013.01); *H01M 8/0267* (2013.01); *H01M 8/04029* (2013.01); *H01M 8/04074* (2013.01); *H01M 2250/20* (2013.01)

(58) Field of Classification Search
CPC ........... C25B 9/75; C25B 11/036; C25B 1/04; C25B 9/73; C25B 9/00; H01M 8/0258; H01M 8/0267; H01M 8/04029; H01M 8/04074; H01M 2250/20; H01M 8/026; H01M 8/0263; H01M 8/0247; Y02T 90/40; Y02E 60/50; Y02E 60/36
See application file for complete search history.

(56) References Cited

U.S. PATENT DOCUMENTS

| | | | |
|---|---|---|---|
| 3,917,520 A | 11/1975 | Katz et al. | |
| 2002/0106551 A1* | 8/2002 | Speranza | ................. C25B 9/19 429/130 |
| 2004/0072058 A1 | 4/2004 | Hibino et al. | |

(Continued)

FOREIGN PATENT DOCUMENTS

| | | |
|---|---|---|
| CN | 109301282 A | 2/2019 |
| DE | 102005021487 B4 | 11/2006 |

(Continued)

OTHER PUBLICATIONS

English translation of DE102005026060.*

(Continued)

*Primary Examiner* — Kiran Quraishi Akhtar
(74) *Attorney, Agent, or Firm* — Greer, Burns & Crain, Ltd.

(57) ABSTRACT

A bipolar plate for use in an electrochemical device is proposed, in which a flow duct runs between two outer boundary surfaces and extends from a peripheral fluid inlet to a peripheral fluid outlet. As a result, very good cooling of electrochemical cells via a bipolar plate which is in surface contact therewith can be achieved.

12 Claims, 4 Drawing Sheets

(56) References Cited

U.S. PATENT DOCUMENTS

| | | |
|---|---|---|
| 2011/0281191 A1 | 11/2011 | Okanishi et al. |
| 2014/0242476 A1 | 8/2014 | Kuhne et al. |
| 2017/0125825 A1* | 5/2017 | Lavenu ................. H01M 8/026 |

FOREIGN PATENT DOCUMENTS

| | | | | |
|---|---|---|---|---|
| DE | 102005026060 | * | 11/2006 | ......... H01M 8/0206 |
| DE | 102005026060 A1 | | 11/2006 | |
| DE | 102010062396 A1 | | 6/2012 | |
| DE | 102014207594 A1 | | 10/2015 | |
| GB | 2178223 A | | 2/1987 | |
| WO | 9967845 A1 | | 12/1999 | |
| WO | WO 99/67845 | * | 12/1999 | .............. H01M 8/02 |
| WO | WO-2003088378 A2 | * | 10/2003 | ......... H01M 8/0254 |

OTHER PUBLICATIONS

German Examination Report for corresponding German Patent Application No. 102018129887.0.

Fahim, K., H., et al., "Effect of Geometric Design of the Flow Fields Plat on the Performance Of A PEM Fuel Cell. A Review" Oct. 2016, 17 pages.

European Search Report for corresponding European Patent Application No. 19210832 dated Aug. 18, 2020.

* cited by examiner

BIPOLAR PLATE FOR USE IN AN ELECTROCHEMICAL DEVICE

CROSS-REFERENCE TO PRIORITY APPLICATION

This application claims the benefit of, and priority to, German patent application number 102018129887.0, filed Nov. 27, 2018. The content of the referenced application is incorporated by reference herein.

TECHNICAL FIELD

Embodiments of the subject matter described herein relate generally to a bipolar plate for use in an electrochemical device. The disclosure further relates to an electrochemical device and to a vehicle, in particular an aircraft or a space vehicle, with such an electrochemical device.

BACKGROUND

An electrochemical device within the meaning of the disclosure can be, for example, an electrolyser with which propulsion materials for a spacecraft or other systems can be generated. An electrolyser could, for example, periodically decompose water into hydrogen and oxygen. For this purpose, at least one electrolysis cell can be provided, with different constructional forms being known for the realization thereof.

Alkali electrolysers and PEM electrolysers are particularly widespread. An alkali electrolyser uses a potassium hydroxide solution as the electrolyte. A membrane permeable to OH— ions serves for separating the arising product gases. Such an electrolyser can be cooled by circulation of the electrolyte. However, an electrolyser on the basis of a proton exchange membrane (PEM) uses distilled water which is supplied to the anode side of the electrolyser. Such an electrolyser could also be designed in the form of a reversible fuel cell. Cooling is carried out in particular by circulation of the supply water. Circulation of the electrolyte or of the supply water may furthermore also be necessary for the phase separation.

An electrolyser which is based on matrix cells does not require a phase separation and consequently also does not require circulation. In some cases, such an electrolyser cannot be cooled either via the supply water or via the electrolyte.

BRIEF SUMMARY

It is an object of the disclosure to propose a cooling device or similar for an electrolyser or another electrochemical cell, with which particularly efficient cooling can take place. In addition, a slow a weight as possible should be able to be realized in respect of use in a vehicle and in particular in a space vehicle.

The object is achieved by a bipolar plate with the features of independent claim 1. Advantageous embodiments and developments can be gathered from the dependent claims and the description below.

A bipolar plate for use in an electrochemical device is proposed, the bipolar plate having a first boundary surface and a second boundary surface arranged parallel thereto, wherein the boundary surfaces are arranged at a distance from each other and enclose an intermediate space, wherein the intermediate space contains at least one flow duct which is connected to a peripherally arranged fluid inlet and a peripherally arranged fluid outlet and is arranged at least in an encircling manner in the intermediate space.

An electrochemical device can be realized as a stack of a plurality of cells, for example fuel cells or electrolysis cells, connected to one another at least electrically. The arrangement in the form of a stack is a reliable and simple technical solution in order, by selection of the number of cells, to increase an effective electrode area and, consequently, to increase the amount of gas which can be produced in an electrolyser. In order to achieve this arrangement, individual cells of alternating polarity are arranged in a row next to one another. Bipolar plates which prevent a fluid connection between adjacent cells, but connect the latter electrically to one another are located in between. This results in an electrical series connection of a plurality of cells, which can be supplemented when required by addition of further cells and bipolar plates.

Accordingly, the bipolar plates are an essential part of such an electrochemical device. They should be dimensioned with sufficient current stability and to be sufficiently gas tight and can also be used for cooling the adjacent cells. If the electrochemical device relates to an electrolyser, the cooling achieved by the bipolar plates is advantageous, in particular in matrix cells, since the electrolyte is fixed there in a porous structure and cannot circulate and consequently also cannot be used for dissipating heat. Even in fuel cells, such bipolar plates can be advantageously usable in order to restrict the temperature level even in constricted installation situations and with an encapsulating housing.

The proposed bipolar plates have two boundary surfaces which are formed parallel to each other and predetermine the actual plate shape of the bipolar plates. The boundary surfaces should preferably be regarded as the surfaces which are formed on the outside of the bipolar plate and are brought into surface contact with the relevant cells. Depending on the desired design of the electrochemical device and in particular of the cells, the boundary surfaces can be round and/or angular. The distance between the two boundary surfaces should be as small as possible such that the electrical resistance is low. Furthermore, the size of the electrochemical device can thereby also be compacted. The boundary surfaces should be brought into surface contact with the respectively adjacent electrolysis cell such that the heat arising there can be absorbed by the bipolar plate.

The at least one flow duct which is connected to a fluid inlet and to a fluid outlet can dissipate the heat. For this purpose, the flow duct is to be thermally connected to the boundary surfaces such that heat which arises at the boundary surfaces is transmitted to the at least one flow duct. By corresponding inflow and outflow of a suitable coolant, the heat can consequently be transmitted to the coolant and discharged from the electrochemical device.

The flow duct can be designed in any desired manner which is suitable for the adjacent cells. The entire available intermediate space does not need to be taken up by the at least one flow duct. The length and extent of the flow duct can be adapted to the anticipated heat flow. Furthermore, the flow duct can be manufactured in different ways. In particular, single and multi part bipolar plates in which a flow duct is integrated are conceivable. The flow duct can be arranged at least in an encircling manner in the intermediate space such that it extends essentially once or more than once about a center point. When encircling the intermediate space once, the flow duct does not inevitably have to extend about 360°, but can also run peripherally in the intermediate space between the fluid inlet and the fluid outlet spaced apart therefrom and in this case can cover less than 360°.

Overall, an excellent transmission of heat and therefore efficient cooling can be carried out by the bipolar plate according to the disclosure even in electrolysis cells in a matrix construction. A particularly compact construction with a low weight for an electrolysis device or another electrochemical device can therefore be realized.

In a preferred embodiment, the at least one flow duct extends spirally at least in regions in the intermediate space. The spiral shape leads to an improved utilization of the available area in the intermediate space and therefore to an improved cooling effect when a coolant flows through the flow duct.

In an advantageous embodiment, the at least one flow duct has a first strand and an adjoining second strand, wherein the first strand is curved in a first direction and the second strand in an opposite second direction. The first strand could consequently be designed in such a manner that the extent formed by the first strand becomes continuously smaller. The first strand could therefore extend from a radially outer region of the intermediate space in the direction of a radially further inner region. In this case, the first strand could run radially inwards to an extent possible taking into consideration the heat dissipation and the curvature which can be realized of the flow duct. In the meantime, the second strand could adjoin the first strand in such a manner that it extends spirally from a radially inner region to a radially further outer region. The particular advantage of such an arrangement not only resides in the very good utilization of the available area, but also in that parts of the flow duct do not need to overlap in order, after a spiral extent, to pass to a fluid inlet or to a fluid outlet. If a spiral profile were implemented merely with a single direction of curvature, a connection from a center point of the spiral form to a radially outer point would be required, wherein then, however, the flow duct is repeatedly crossed. This can therefore be prevented by the use of the two strands with opposite directions of curvature. The required thickness for the bipolar plate can thereby be minimized.

Preferably, the first boundary surface is formed on a first plate like component and the second boundary surface is formed on a second plate like component, wherein the two plate like components enclose the at least one flow duct and are connected to each other peripherally at least in regions. The at least one flow duct can be realized very easily in such a construction. It is conceivable to provide a first plate like component into which the at least one flow duct is milled in the form of grooves. The other plate like component can be placed onto the first plate like component in order to close the grooves and therefore the flow duct. A cohesive bipolar plate can be produced by the two plate like components being connected peripherally at least in regions. Such a construction is highly flexible and can be produced relatively cost effectively.

In a preferred embodiment, the at least one flow duct is formed by at least one depression which is arranged in at least one of the two plate like components. The depression can be configured in the form of a groove by a material removing method, for example milling. Alternatively thereto, the depression can also be produced by being pressed in or by other deformation methods. It may be appropriate to arrange the depression merely on one of the components. However, it would also be conceivable to arrange a depression on both components. The depressions could be designed in such a manner that they are aligned when the components are placed on each other.

In an advantageous embodiment, the at least one flow duct comprises two or more flow paths which run parallel to and at a distance from one another. The surface and the cross section of the flow duct overall can thereby be increased, with the flow resistance simultaneously being reduced. A greater volumetric flow and therefore a further improvement in the cooling are thereby possible. It is conceivable to even somewhat reduce the required thickness of the bipolar plate in comparison to a bipolar plate with a flow duct having an individual flow path, thus resulting both in a large area through which the flow passes and also in as low a flow resistance as possible.

Particularly preferably, the flow paths run at a distance from one another and are not connected to one another. The flow paths consequently each form an independent flow duct, and therefore said flow paths could also be distributed or split over a greater area.

In a further advantageous embodiment, the bipolar plate is produced by a generative manufacturing method, and the at least one flow duct is integrated in the bipolar plate without joining points. The generative method is a layer building method, in which the component is built up layer by layer by application and/or solidification of material. As a result, internal cavities can be produced as desired, and the component which is produced has no joining points or the like whatsoever. It may be appropriate to smooth the at least one flow duct by additional measures, for example by use of an etching solution or the like.

It is appropriate in particular to produce the bipolar plate from a metallic material, and therefore a very good transfer of heat can be realized. When a generative manufacturing method is used, even more complex flow ducts that can be produced only in a costly way by other methods may be provided.

The use of further materials is also conceivable in order to reduce the density and therefore the weight of the bipolar plates. Materials having sufficient electrical and thermal conductivity are come into consideration. In addition to ceramic materials, use could also be made of polymers which have suitable additives for achieving the electrical conductivity.

In a further embodiment of the bipolar plate, at least one heat pipe can be arranged in the intermediate space, wherein the flow duct is thermally coupled to the at least one heat pipe. The bipolar plate can thereby have a very simple and in particular single layered construction. For the improved transmission of heat from an inner region of one of the boundary surfaces, use can be made of the at least one heat pipe which outputs the absorbed heat to the encircling cooling duct. A heat pipe conventionally has a vessel with an evaporator and a condenser. The vessel can be adapted to the shape of the bipolar plate and, for example, can be of flat or tubular design. Tubular designs can be rectilinear or bent. The evaporator and the condenser could be located at points spaced apart radially from one another, for example the evaporator could be located radially further inwards or the condenser radially further outwards. The condenser is preferably coupled to the at least one flow duct, and therefore it transfers the heat supplied by the evaporator thermally via the condenser into the at least one flow duct.

The disclosure further relates to an electrochemical device with a plurality of electrochemical cells and a plurality of bipolar plates, wherein the electrochemical cells and the bipolar plates are provided in an alternating sequence.

It may be appropriate to form at least one of the bipolar plates without a flow duct. Consequently, heat can be transmitted by an electrochemical cell in each case only on one side to a bipolar plate present there. This results in an even lower weight of the device since the bipolar plates without such a flow duct can be realized significantly thinner than the bipolar plates with a flow duct. It could be particularly advantageous to use a bipolar plate with a flow duct and a bipolar plate without a flow duct in an alternating manner. It should be ensured that each electrochemical cell is directly adjacent to at least one bipolar plate with a flow duct. This means that said cell is in flush surface contact with said bipolar plate.

In a particularly advantageous embodiment, the electrochemical cells are designed as matrix cells. The electrolyte is present there in a porous structure which is connected to the electrodes.

In a further advantageous embodiment of the device, the at least one flow duct has two or more flow paths, wherein the device is configured for a coolant to flow through the flow paths in opposite directions. This permits an even greater improvement in the transmission of heat since two opposed temperature gradients from a radially outer side to a radially further inner side are set via the bipolar plate.

Finally, the disclosure relates to a vehicle in which at least one abovementioned electrochemical device is arranged.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible uses will be found in the following description of the exemplary embodiments and the figures. Here, all the features described and/or depicted pictorially, in themselves and in any desired combination, form the subject matter of the disclosure, even when considered independently of their combination in the individual claims or the dependency references thereof. In the figures, the same reference signs furthermore stand for identical or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
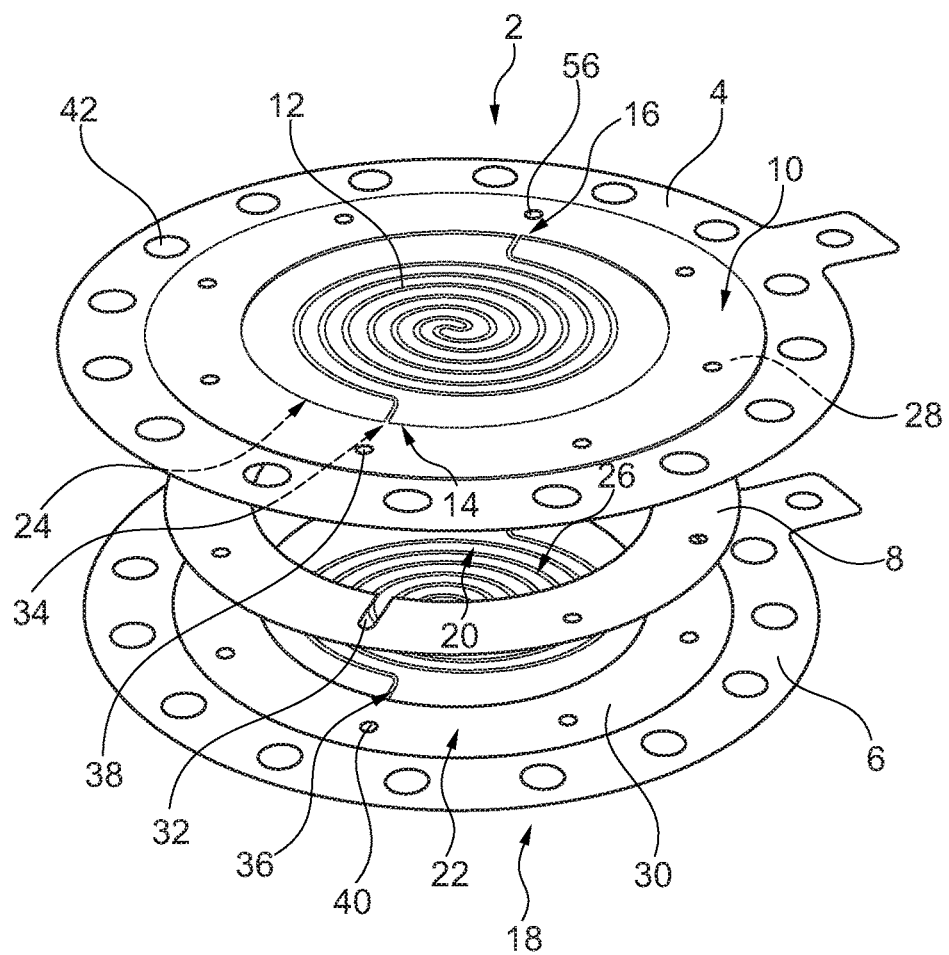
FIG. 1 shows a bipolar plate in an exploded illustration.

FIG. 1 shows an exemplary construction of a bipolar plate 2 in an exploded illustration. The bipolar plate 2 has a first plate like component 4, a second plate like component 6 and an intermediate ring 8. These three components are produced in particular from a metallic material in order to be able to provide sufficient electron conductivity. They can preferably be welded fluid tightly to one another in order to form the bipolar plate 2. The material can comprise nickel, in particular when the electrochemical device is designed as an electrolysis device. All of the components can preferably be composed of the same material.

The first component 4 has a first boundary surface 10 which is directed outwards as an outer surface and faces away from the second component 6. Located on the first boundary surface 10 are spirally arranged first gas ducts 12 in the form of outwardly open grooves which are produced, for example, by milling or pressing in of the spiral shape.

If the first boundary surface 10 is in direct surface contact with an electrode of a cell of an electrochemical device, the first gas ducts 12 can function for supplying the cell with a material flow or for removing same. The profile of the gas ducts can be correspondingly adapted depending on the type of cell. In the exemplary embodiment shown, the first gas ducts 12 extend in a centrally positioned double spiral arrangement traversing somewhat less than half the radius of the first component 4, wherein a first end 14 and a second end 16 are arranged on two mutually diametrically oppositely arranged lateral sides of the first component 4. The two ends 14 and 16 of the first gas ducts 12 are at, for example, approximately the same distance from a center point of the first component 4. The double spiral arrangement shown here will be explained in more detail further below with reference to FIG. 2.

The second component 6 has substantially the same construction, but is formed in a mirror inverted manner with respect to the first component 4. A side of the second component 6 that faces away from the first component 4 is defined further below as second boundary surface 18.

An intermediate space which is enclosed by the two boundary surfaces 10 and 18 after the two components 4 and 6 are connected has a flow duct which extends spirally in the intermediate space. For this purpose, for example, the first component 4, on a first inner surface 20, and the second component 6, on a second inner surface 22, each have a depression in the form of a spiral groove 24 and 26. When the inner surfaces 20 and 22 are placed onto each other, the two grooves 24 and 26 are arranged flush on each other in such a manner that a closed flow duct is produced. The first groove 24 and the second groove 26 have a first inlet 34 and a second inlet 36, respectively. As an alternative thereto, also only one of the two components 4 and 6 can have a depression on an inner surface 20 or 22, wherein the inner surface 20 or 22 of the other component 4 or 6 in each case is preferably flat.

The first component 4 has a first encircling depression 28 and the second component 6 has a second encircling depression 30, the depressions each corresponding with the intermediate ring 8. The depressions 28 and 30 are aligned when the components 4 and 6 are connected to each other, and enclose the intermediate ring 8 in a flush manner. It can be seen in FIG. 1 that the intermediate ring 8, at a radially inner position, has a first cutout 32 which can be brought into alignment with a first inlet 34 of the first groove 24 and a second inlet 36 of the second groove 26.

A first connection bore 38 and a second connection bore 40 each adjoin radially further on the outside and are also aligned with the cutout 32. When the bipolar plate 2 is assembled, a fluid can pass through the first and second connection bores 38 and 40 into the cutout 32 and from there into the flow duct. Furthermore, fastening bores 42 by which the bipolar plates 2 can in each case be fastened in a desired axial position to an electrochemical device are distributed circumferentially on the two components 4 and 6.

It is conceivable for the first gas ducts 12 on the first boundary surface 10 to be designed as negatives of the first grooves 24, and therefore, by impression or pressing in the first grooves 24, the first gas ducts 12 are simultaneously formed. This can be realized in an analogous manner in the first component 6 in which the second grooves 24 are impressed, and therefore corresponding second gas ducts (not shown here) arise on the second boundary surface 18.

Figure 2:
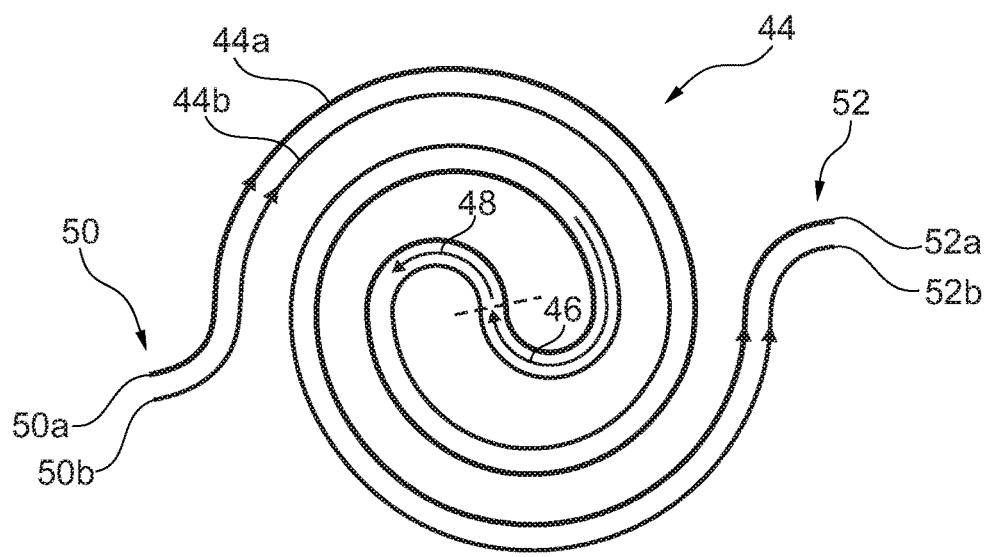
FIG. 2 shows a double spiral flow duct in a schematic view.

FIG. 2 shows a flow duct 44 in a schematic illustration with an indication of flow direction arrows. Said flow duct 44 can readily be realized between the components 4 and 6 by the first and second grooves 24 and 26 being correspondingly configured. By way of example, the flow duct 44 has two independent flow paths 44a and 44b which run parallel to each other and through which the flow can pass in the same direction or in opposite directions.

The flow duct 44 has a first strand 46, the extent of which is indicated by an end marking. This is adjoined by a second strand 48 which is indicated with the aid of a beginning marking. In the first strand 46, the flow duct 44 follows a first direction of curvature which, in the example shown, runs in the clockwise direction. In the subsequent second strand 48, the flow duct 44 is curved in an opposite direction, i.e. counterclockwise. The flow duct 44 has a fluid inlet 50 and a fluid outlet 52. While a spiral shape with a reducing diameter emerges from the fluid inlet 50, which here has two separate inlet connections 50a and 50b, along the first strand 46, in the second strand 48 a spiral shape with a widening diameter is undertaken in the direction of the fluid outlet 52 which has two outlet connections 52a and 52b.

The particular advantage of this design resides in the fact that, despite a spiral shape, parts of the flow duct 44 do not need to crossover in order to reach in one plane from the fluid inlet 50 to the fluid outlet 52. A significant reduction in the required thickness of the bipolar plate 2 can thereby be achieved. In addition, the use of a plurality of strands 33a and 44b arranged parallel to one another makes it possible to achieve, even in the case of a small overall height, a high volumetric flow without overcoming a high flow resistance. Furthermore, the shown shape of the double spirals would make it conceivable to provide further individual strands 44c, 44d, etc. and thereby to increase the volumetric flow even further and/or to reduce the pressure difference arising over the flow duct 44.

Figure 3A:
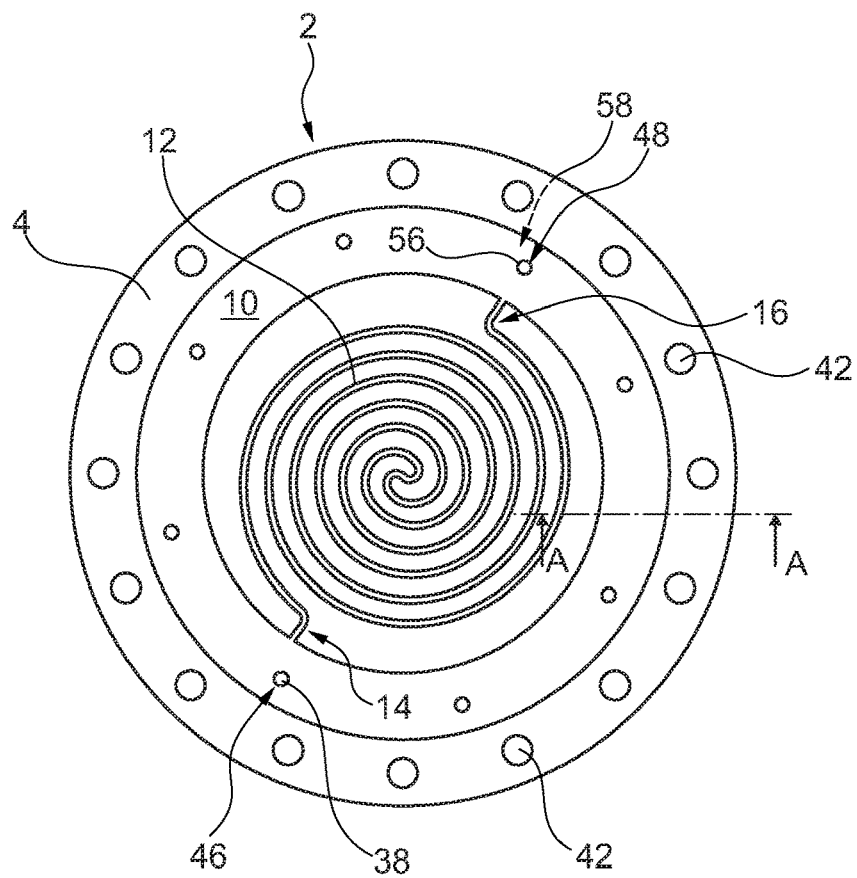
FIGS. 3a and 3b show the bipolar plate in a top view and in a partial section.
Figure 3B:
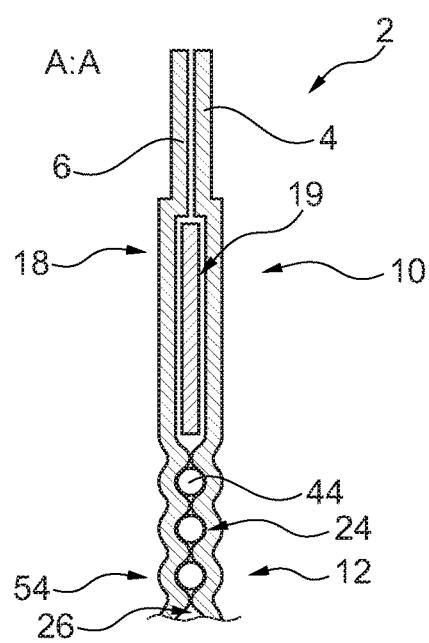

FIGS. 3a and 3b show the bipolar plate 2 in an assembled shape. FIG. 3a shows a top view of the first boundary surface 10 in which the first gas ducts 12 can be seen. Fluid can pass into the fluid inlet 50 through the first connection bore 38. Fluid can emerge from the fluid outlet 52 through an analogously designed third connection bore 56 which is aligned with a fourth connection bore 58.

FIG. 3b shows a partial section through the bipolar plate 2. The first component 4, the second component 6 and the intermediate ring 8 are welded to one another here, and therefore a cohesive, fluid tight element is provided. An intermediate space 19 is enclosed between the two boundary surfaces 10 and 18. The flow duct 44 is formed by the first groove 24 and the second groove 26 which lie flush on each other. Said flow duct then extends in double spiral form through the bipolar plate 2, as illustrated in FIG. 2.

Figure 4:
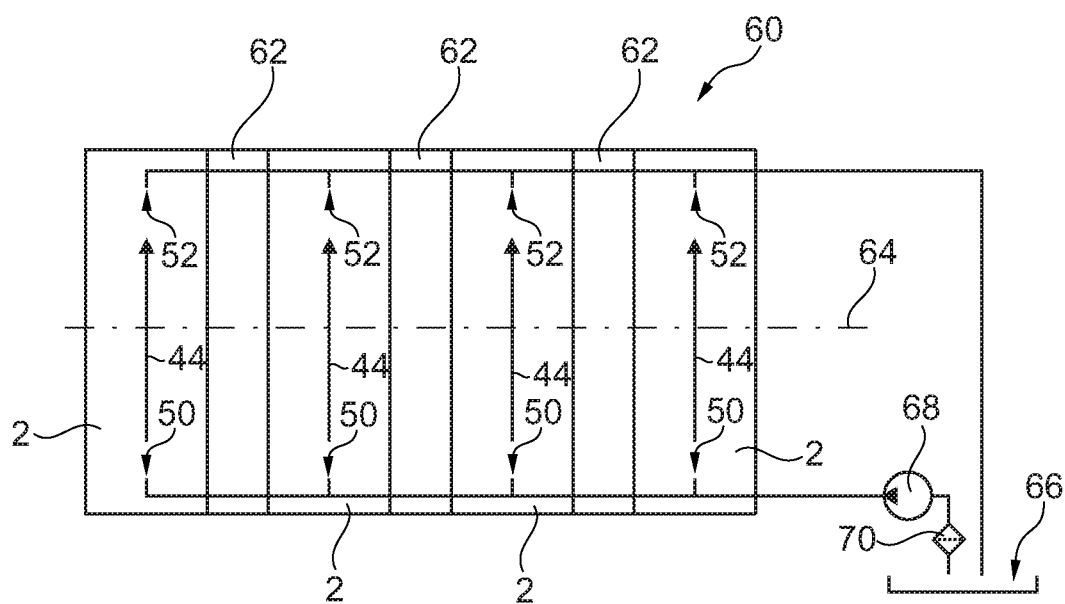
FIG. 4 shows an electrochemical device in a simplified side view.

FIG. 4 shows in highly schematic form an electrochemical device 60 with a plurality of electrochemical cells 62 which are each enclosed by two bipolar plates 2. The electrochemical cells 62 can in particular have electrolysers or fuel cells. The device 60 extends along an axis 64 and can be supplemented as desired by further cells 62 and bipolar plates 2. The fluid inlets 50 are supplied, by way of example by a coolant source 66 which is illustrated here as a reservoir, with coolant via a pump 68.

Furthermore, a filter 70 is arranged between the coolant source and the pump 68. Of course, the supply to the flow ducts 44 can also be ensured in a different manner. By means of the axial arrangement of the cells 62 and bipolar plates 2, a supply to the individual fluid inlets 50 can take place by a first collecting supply line 70 and the removal from the individual fluid outlets 52 by means of a collecting removal line 72 which extends through the device 60.

Figure 5:
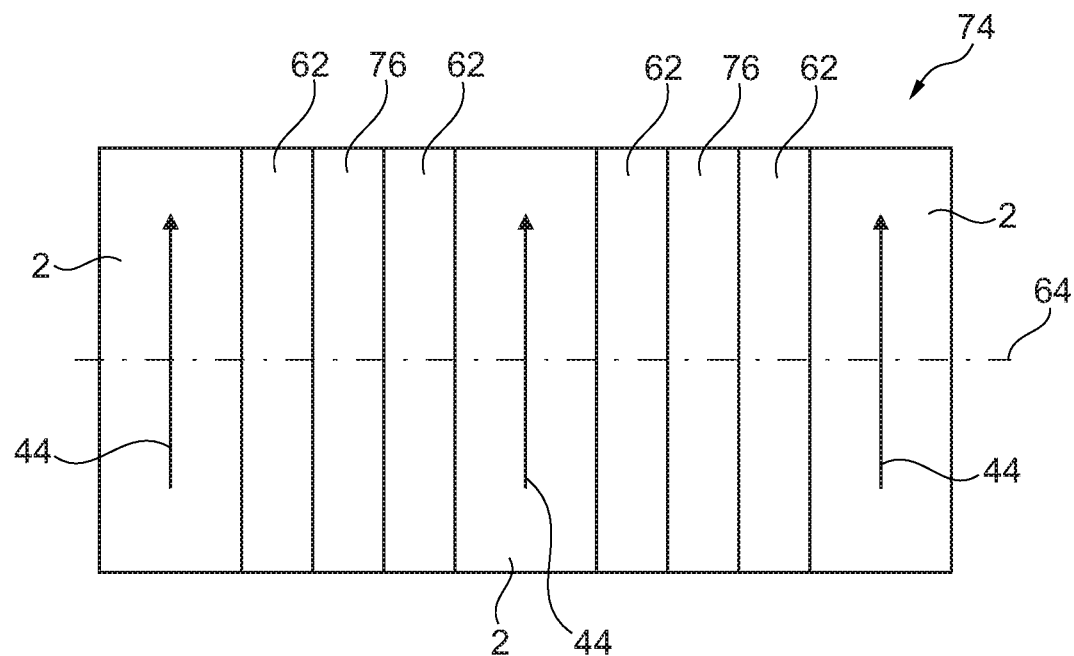
FIG. 5 shows a modified electrochemical device in a simplified side view.

In order to save weight and constructional volume, use can be made of a modified electrochemical device 74, as is shown in FIG. 5. For the sake of simplicity, the lines 70 and 72 are omitted in FIG. 5. Every second bipolar plate 2 is replaced here by a bipolar plate 76 which does not have a flow duct 44, but rather is merely electrically conductive. Each cell 62 is therefore cooled by just one directly adjacent bipolar plate 2 with a flow duct 44. Every second bipolar plate 76 can therefore bring about a saving on volume and weight, which is advantageous in particular for mobile use.

Figure 6:
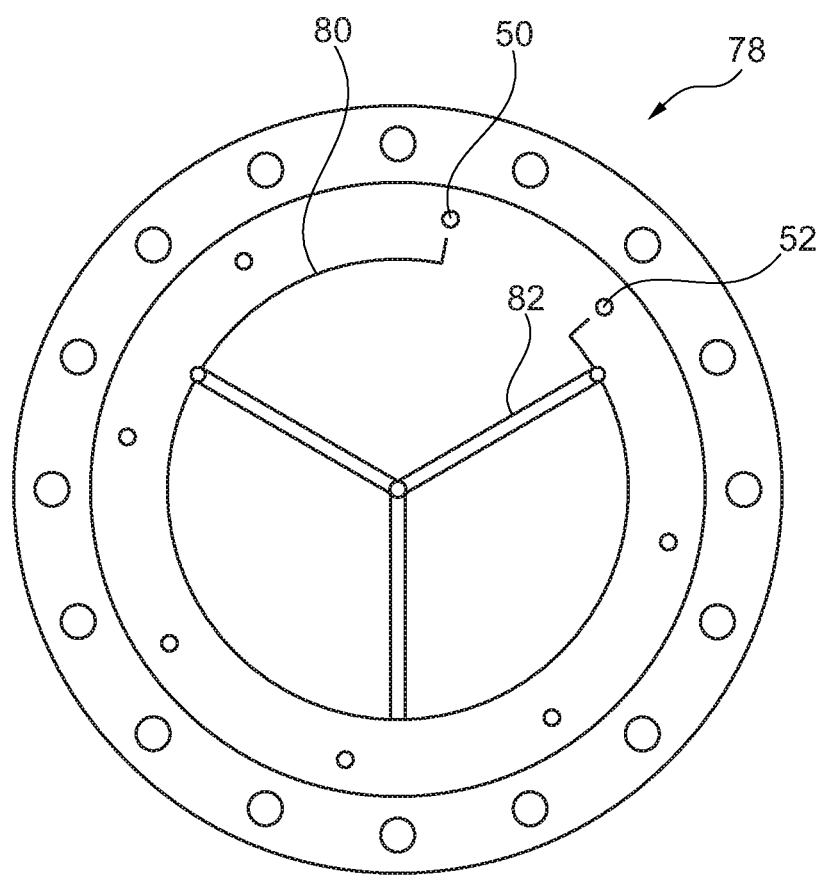
FIG. 6 shows a further embodiment of a bipolar plate in a schematic top view.

Finally, FIG. 6 shows a further exemplary embodiment of a bipolar plate 78 which, instead of a spiral flow duct, merely has an encircling flow duct 80. The latter is thermally coupled to, by way of example, three tubular heat pipes 82. Heat which is absorbed by the heat pipes 82 thereby passes with a high degree of efficiency into the flow duct 80 and can be absorbed there by a coolant which flows into the fluid inlet 50 and leaves the flow duct through the fluid outlet 52. For this purpose, for example, the radially further inward regions of the heat pipes 82 act as evaporators and the radially further outward regions as condensers which are coupled to the flow duct 80. However, differently configured heat pipes which have a more flat shape and are coupled as required to flow ducts of this exemplary embodiment or of the previous exemplary embodiment are also possible.

It should additionally be noted that "having" does not exclude any other elements or steps and "a" or "an" does not exclude a multiplicity. It should furthermore be noted that features which have been described with reference to one of the above exemplary embodiments can also be used in combination with other features of other exemplary embodiments described above. Reference signs in the claims should not be regarded as restrictive.

REFERENCE NUMBERS

2 Bipolar plate
4 First plate like component
6 Second plate like component
8 Intermediate ring
10 First boundary surface
12 First gas ducts
14 First end
16 Second end
18 Second boundary surface
19 Intermediate space
20 First inner surface
22 Second inner surface
24 First groove
26 Second groove
28 First depression
30 Second depression
32 First cutout
34 First inlet 36 Second inlet
38 First connection bore
40 Second connection bore
42 Fastening bore
44 Flow duct
44a, 44b Flow path
46 First strand
48 Second strand
50 Fluid inlet
52 Fluid outlet
54 Second gas ducts
56 Third connection bore
58 Fourth connection bore
60 Electrochemical device
62 Electrochemical cell
64 Axis
66 Coolant source
68 Pump
70 Collecting supply line
72 Collecting removal line
74 Electrochemical device
76 Bipolar plate without flow duct
78 Bipolar plate
80 Flow duct
82 Heat pipe While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A bipolar plate for use in an electrochemical device comprising:
    a first boundary surface; and
    a second boundary surface arranged parallel to and facing the first boundary surface,
        wherein the first and second boundary surfaces are arranged at a distance from each other, enclosing an intermediate space,
        wherein the intermediate space contains at least one flow duct which is connected to a peripherally arranged fluid inlet and a peripherally arranged fluid outlet and is arranged at least in an encircling manner in the intermediate space,
    wherein the at least one flow duct has a first flow path and a second flow path,
    wherein the first flow path is parallel to the second flow path, and the first flow path and the second flow path are not connected to one another,
    wherein the at least one flow duct extends at least once about a center point, and
    wherein a first coolant flow within the first flow path flows and a second coolant flow within the second flow path flow in one of a same direction or opposite directions
    wherein at least one heat pipe arranged in the intermediate space, wherein the at least one flow duct is thermally coupled to the at least one heat pipe.

2. The bipolar plate according to claim 1, wherein the at least one flow duct extends spirally at least in regions in the intermediate space.

3. The bipolar plate according to claim 2, wherein the at least one flow duct has a first strand and an adjoining second strand, wherein the first strand is curved in a first direction and the second strand in an opposite second direction.

4. The bipolar plate according to claim 1, wherein:
    the first boundary surface is formed on a first plate like component;
    the second boundary surface is formed on a second plate like component; and the first and second plate like components enclose the at least one flow duct, and are connected to each other peripherally at least in regions.

5. The bipolar plate according to claim 4, wherein the at least one flow duct is formed by at least one depression which is arranged in at least one of the first and second plate like components.

6. The bipolar plate according to claim 1, wherein the bipolar plate is produced by a generative manufacturing method, and the at least one flow duct is integrated in the bipolar plate without joining points.

7. An electrochemical device comprising:
    a plurality of electrochemical cells; and
    a plurality of bipolar plates according to claim 1, wherein the electrochemical cells and the bipolar plates are provided in an alternating sequence.

8. The electrochemical device according to claim 7, wherein the cells are electrolysis cells.

9. The electrochemical device according to claim 7, further comprising at least one bipolar plate formed without a flow duct.

10. The electrochemical device according to claim 7, wherein the cells are matrix cells.

11. The electrochemical device according to claim 7, wherein the at least one flow duct has two or more flow paths, wherein the electrochemical device is configured for a coolant to flow through the flow paths in opposite directions.

12. A vehicle comprising at least one electrochemical device according to claim 7.

* * * * *